(12) United States Patent
Lee et al.

(10) Patent No.: US 10,690,839 B2
(45) Date of Patent: Jun. 23, 2020

(54) REFLECTIVE POLARIZING MODULE FOR ENABLING BENDING REDUCTION AND BACK LIGHT UNIT HAVING SAME

(71) Applicant: LMS Co., Ltd., Pyeongtaek-si, Gyeonggi-do (KR)

(72) Inventors: Eun Mi Lee, Suwon-si (KR); Jang Hee Cho, Suwon-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 357 days.

(21) Appl. No.: 15/739,630

(22) PCT Filed: Jun. 8, 2016

(86) PCT No.: PCT/KR2016/006069
§ 371 (c)(1),
(2) Date: May 29, 2018

(87) PCT Pub. No.: WO2016/208892
PCT Pub. Date: Dec. 29, 2016

(65) Prior Publication Data
US 2018/0292600 A1 Oct. 11, 2018

(30) Foreign Application Priority Data

Jun. 23, 2015 (KR) .................. 10-2015-0089012

(51) Int. Cl.
*G02F 1/1335* (2006.01)
*F21V 8/00* (2006.01)
*G02F 1/13357* (2006.01)

(52) U.S. Cl.
CPC ......... *G02B 6/0085* (2013.01); *G02B 6/0051* (2013.01); *G02B 6/0055* (2013.01);
(Continued)

(58) Field of Classification Search
CPC ... G02F 1/1335; G02B 6/0085; G02B 6/0055; G02B 6/0056; G02B 6/0051; G02B 6/0053
See application file for complete search history.

(56) References Cited

U.S. PATENT DOCUMENTS

2007/0046872 A1* 3/2007 Tasaka .............. G02F 1/133528
349/118
2018/0172891 A1* 6/2018 Lee ...................... G02B 6/0056

FOREIGN PATENT DOCUMENTS

JP         4644661 B2      3/2011
KR    10-2005-0054543 A   6/2005
(Continued)

OTHER PUBLICATIONS

International Search Report dated Sep. 28, 2016 issued in parent application PCT/KR2016/006069.

*Primary Examiner* — Karabi Guharay
(74) *Attorney, Agent, or Firm* — Polsinelli PC

(57) ABSTRACT

The present invention provides a reflective polarizing module for enabling bending reduction, comprising: a reflective polarizing sheet having a cooling surface in which a plurality of stacks having different refractive indices from each other are laminated to selectively transmit light and which is cooled by being in contact with a separate cooling roll in a heated state, and an outer exposed surface which is placed in a stacked form on an upper portion of the cooling surface and is exposed to air to thereby slowly cool, wherein the reflective polarizing sheet has a shrinkage rate of the cooling surface by means of a temperature rise which is relatively higher than the shrinkage rate of the outer exposed surface; and an adhesive layer which is provided to at least any one of the cooling surface or the outer exposed layer to thereby bond a separate optical module and the reflective polarizing sheet, and reduce shrinkage and bending of the reflective (Continued)

polarizing sheet according to a temperature rise due to a shrinkage rate difference between the cooling surface and the outer exposed surface.

20 Claims, 10 Drawing Sheets

(52) U.S. Cl.
CPC ......... *G02B 6/0056* (2013.01); *G02F 1/1335* (2013.01); *G02B 6/0046* (2013.01); *G02B 6/0053* (2013.01); *G02B 6/0065* (2013.01); *G02F 1/133606* (2013.01)

(56) References Cited

FOREIGN PATENT DOCUMENTS

| | | | |
|---|---|---|---|
| KR | 10-2009-0026298 | A | 3/2009 |
| KR | 10-2009-0047485 | A | 5/2009 |
| KR | 10-2014-0088538 | A | 7/2014 |

* cited by examiner

REFLECTIVE POLARIZING MODULE FOR ENABLING BENDING REDUCTION AND BACK LIGHT UNIT HAVING SAME

CROSS-REFERENCE TO RELATED APPLICATIONS

The present application claims the benefit of Korean Patent Application No. 10-2015-0089012 filed on Jun. 23, 2015 and PCT Application No. PCT/KR2016/006069 filed on Jun. 8, 2016, which are hereby incorporated by reference in their entirety.

TECHNICAL FIELD

The present invention relates to a reflective polarizing module enabling a reduction in bending and a backlight unit including the same, and more particularly, to a light concentrating module enabling a reduction in bending, capable of preventing bending of a reflective polarizing sheet by using a contraction ratio difference generated during the formation of the reflective polarizing sheet transmitting only specific polarized light, and a backlight unit including the same.

BACKGROUND ART

Recently, the use of flat display panels has increased, a liquid crystal display (LCD) being a representative flat display panel.

Generally, unlike an existing cathode ray tube (CRT), such an LCD requires a backlight module providing light uniformly to an entire screen.

Specifically, such a backlight unit has a configuration by which light is uniformly provided to a rear surface of the LCD, and is configured such that a light source, i.e. a light-emitting diode (LED), is disposed on an edge of a light guide plate, and the light guide plate includes a reflective plate on a lower surface thereof to transfer light generated by the light source upwardly.

In the aforementioned configuration, the light generated by the light source is transferred upwardly by the light guide plate and the reflective plate, and the transferred light is transferred upwardly through a light condensing sheet uniformly.

In addition thereto, a separate reflective polarization sheet is provided on an upper portion of the light condensing sheet to only transmit specific polarized light upwardly, thereby stably transferring condensed light externally.

A general prism sheet may be used as the light condensing sheet.

As described above, the backlight unit is configured such that the light generated by the light source provided on the one side surface is transferred upwardly by the light guide plate and the reflective plate and the transferred light is uniformly condensed through the light condensing sheet.

Meanwhile, when the backlight unit includes a reflective polarization sheet, light can be transferred upwardly in a state of being uniformly condensed. Thus, the reflective polarization sheet is widely used. However, the reflective polarization sheet may be bent due to an increase in temperature, caused by elongated usage of the backlight unit.

Generally, the reflective polarization sheet is formed by hardening a plurality of stacks in a state of being expanded, and is contracted when a temperature thereof is increased. Cooling and hardening are performed using a separate cooling roll at the time of forming the reflective polarization sheet. One surface of the reflective polarization sheet, contacting the cooling roll, has a different contraction ratio to that of the other surface hereof, not contacting the cooling roll, due to a difference in cooling rates.

Therefore, when a temperature of the reflective polarization sheet is increased, due to a contraction ratio difference, bending may be generated, such that one surface of the reflective polarization sheet may protrude.

In this regard, when the temperature of the reflective polarization sheet is not increased, the reflective polarization sheet is not bent. However, when the reflective polarization sheet is used in a general LCD, heat is generated in the general LCD. Thus, the temperature of the reflective polarization sheet may be increased, contracting the reflective polarization sheet.

In this case, the reflective polarization sheet may be bent. Thus, light transferred through a lower portion of the reflective polarization sheet may not be uniformly transferred externally.

In addition, when an LCD is continuously used in a state in which the reflective polarization sheet is bent, exfoliation may be generated due to humidity or heat.

DISCLOSURE

Technical Problem

An aspect of the present invention provides a reflective polarizing module enabling a reduction in bending, capable of reducing bending caused by an increase in temperature of a reflective polarization sheet due to a difference between a contraction ratio of a bonding layer and a contraction ratio of the reflective polarization sheet by separately providing the bonding layer on the reflective polarization sheet, and a backlight unit including the same.

Technical problems to be solved by the present invention are not restricted to those mentioned above, and any other technical problems not mentioned herein will be clearly appreciated by those having skill in the art from the following description.

Technical Solution

According to an aspect of the present invention, there is provided a reflective polarizing module enabling a reduction in bending, the reflective polarizing module including: a reflective polarization sheet in a form of a multilayer stack having different refractive indices to selectively transmit light, the reflective polarization sheet comprising a cooled surface cooled in contact with a separate cooling roll in a heated state and an exposed surface stacked on an upper surface of the cooled surface and slowly cooled while being exposed to air, wherein a contraction ratio of the cooled surface, due to an increase in temperature, is greater than a contraction ratio of the exposed surface; and a bonding layer disposed on at least one of the cooled surface and the exposed surface to bond the reflective polarization module and a separate optical module to reduce contraction and bending of the reflective polarization sheet, caused by an increase in temperature of the reflective polarization sheet due to a difference between the contraction ratio of the cooled surface and the contraction ratio of the exposed surface.

The bonding layer may be disposed on the cooled surface and has a contraction ratio lower than a contraction ratio of the cooled surface, due to an increase in temperature.

The bonding layer may be disposed on the exposed surface and has a contraction ratio greater than a contraction ratio of the exposed surface, due to an increase in temperature.

The reflective polarization sheet may include the multilayer stack, and a contraction ratio of the reflective polarization sheet may gradually increase in a stacking direction from the exposed surface to the cooled surface.

The reflective polarization sheet may include the multilayer stack hardened in an expanded state, which is re-contracted when a temperature increases.

The reflective polarization sheet may be cooled in a stacking state by the separate cooling roll and may be bent in a direction from the cooled surface to the exposed surface, due to a shape of the separate cooled surface.

The reflective polarization sheet may have a pattern located on any one surface of the cooled surface and the exposed surface.

The reflective polarizing module may further include a first light condensing sheet comprising a first structural pattern including continuously-repeated first unit light-condensing objects, with each transverse cross-section thereof gradually decreasing toward an upper portion thereof, wherein at least a portion of each of the first unit light-condensing objects is embedded in the bonding layer.

The first unit light-condensing objects may have non-uniform heights from a bottom to a top thereof.

The first unit light-condensing objects of the first structural pattern may be elongated and repeated, and heights of the first unit light-condensing objects may vary in an extension direction.

Advantageous Effects

The present invention for overcoming the aforementioned problems has the following advantageous effects.

According to an aspect of the present invention, in order to reduce bending caused by the increase in temperature of the reflective polarization sheet, by using a contraction ratio difference generated during the formation of the reflective polarization sheet, the bonding layer can be bonded to the reflective polarization sheet by adjusting a contraction ratio of the bonding layer, thereby reducing a decrease in a light condensing effect and a decrease in durability, caused by the contraction of the reflective polarization sheet.

The effects of the present invention are not limited to those described above and other effects, not stated herein, may be apparent to those skilled in the art from reference to the claims.

BEST MODE

Figure 1:
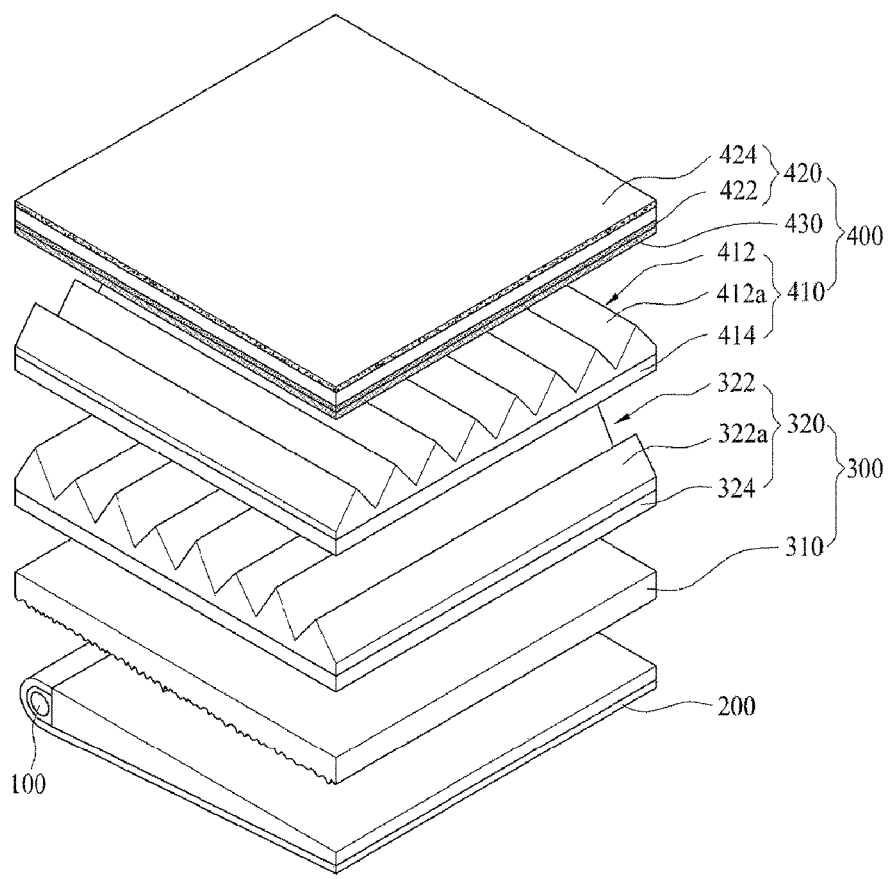
FIG. 1 is a schematic exploded perspective view illustrating a configuration of a backlight unit including a light reflective polarizing module according to the present invention.

Hereinafter, exemplary embodiments of the present invention by which an object of the present invention can be concretely realized will be described with reference to the accompanying drawings. In describing the present embodiment, the same configurations are described using the same names and with the same reference numerals, and the excessive descriptions thereof will be omitted.

Hereinafter, it is illustrated that a backlight unit including a reflective polarizing module according to an embodiment of the present invention is applied to a flat liquid crystal display device, such as an LCD or LED panel. However, the present invention is not limited thereto, and an optical sheet may be independently used. The backlight unit may be applied to other apparatus rather than a liquid crystal display device, or may be applied to any device as long as a device such as a lighting device changes characteristics and a path of light.

<Configuration>

First, a schematic configuration of the backlight unit including the reflective polarizing module according to the embodiment of the present invention will be described as follows with reference to FIGS. 1 to 5.

Figure 2:
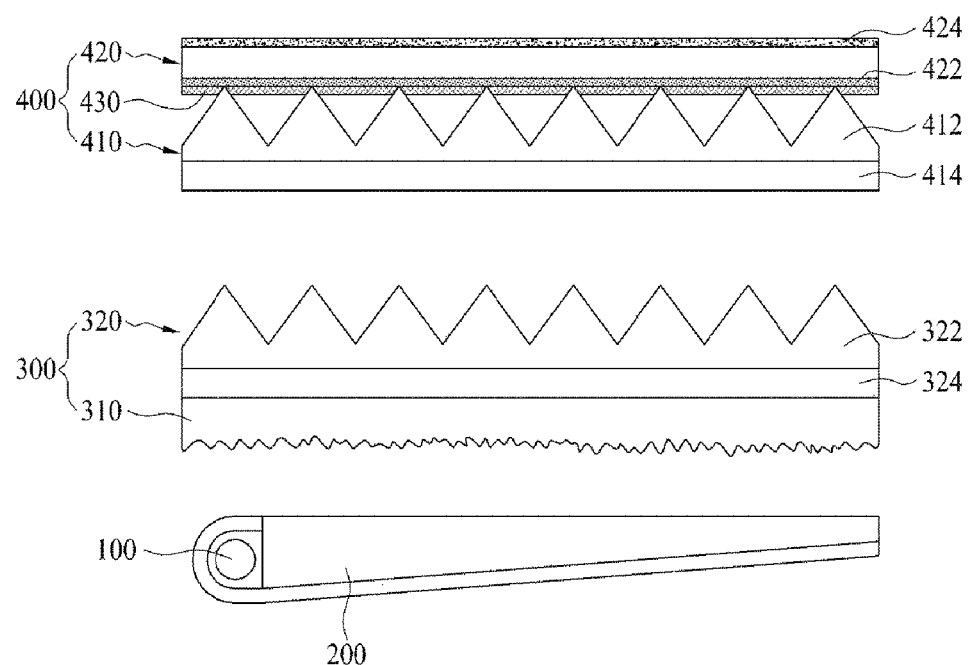
FIG. 2 is a schematic view illustrating a configuration of the reflective polarizing module and an optical module in the backlight unit of FIG. 1.
Figure 3:
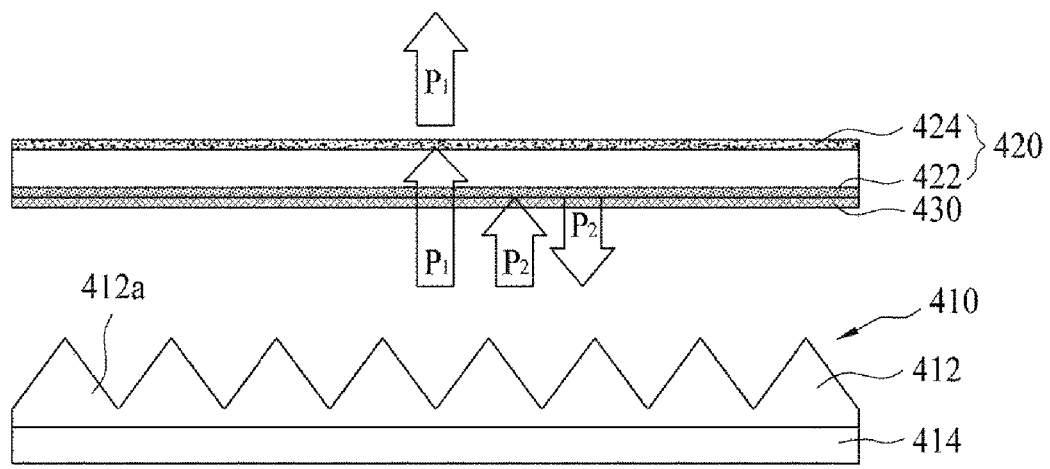
FIG. 3 is a view illustrating a reflective polarization sheet in the backlight unit of FIG. 1, transmitting only a portion of light.

FIG. 1 is a schematic exploded perspective view illustrating a configuration of the backlight unit including the reflective polarizing module according to the present invention, FIG. 2 is a schematic view illustrating a configuration of the reflective polarizing module and an optical module in the backlight unit of FIG. 1, and FIG. 3 is a view illustrating a reflective polarization sheet in the backlight unit of FIG. 1, transmitting only a portion of light.

Figure 4:
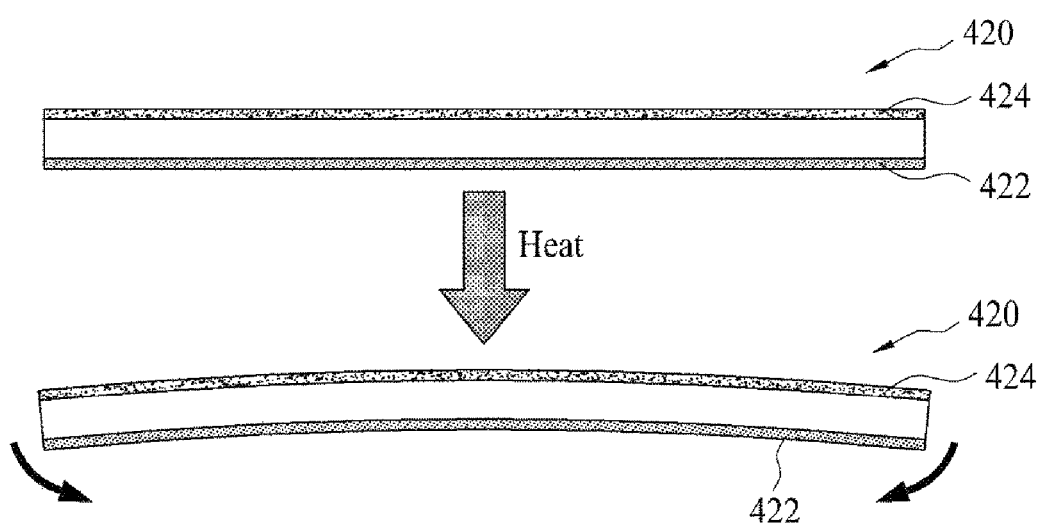
FIG. 4 is a view illustrating a state in which the reflective polarization sheet is bent, due to a difference between a contraction ratio of a cooled surface thereof and a contraction ratio of an exposed surface thereof in the backlight unit of FIG. 1.
Figure 5:
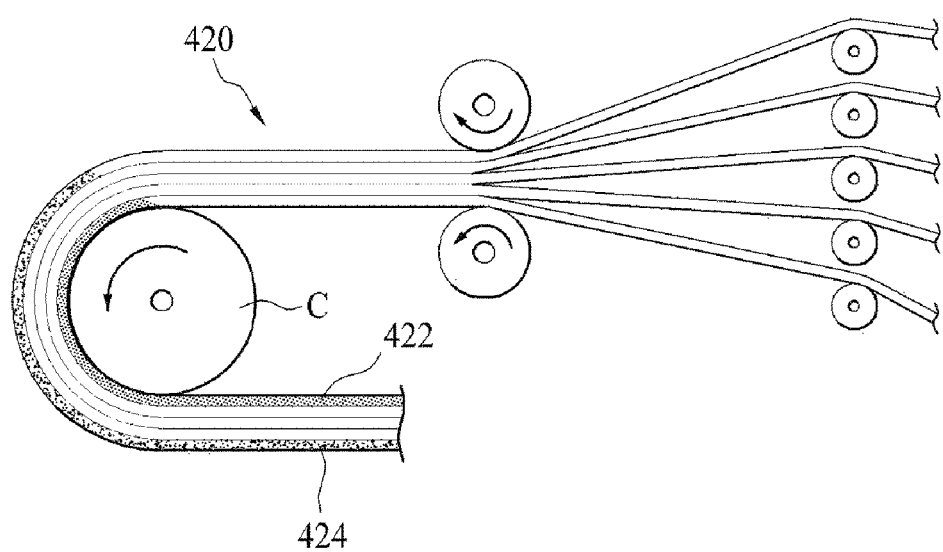
FIG. 5 is a view illustrating a state in which the reflective polarization sheet of FIG. 4 is formed.

FIG. 4 is a view illustrating a case in which the reflective polarization sheet is bent due to a difference between a contraction ratio of a cooled surface thereof and a contraction ratio of an exposed surface thereof in the backlight unit of FIG. 1, and FIG. 5 is a view illustrating a state in which the reflective polarization sheet of FIG. 4 is formed.

As illustrated in FIG. 1, a liquid crystal display device should essentially include a backlight unit that providing light to a liquid crystal panel. The aforementioned backlight unit may include a light source 100, a light guide plate 200, an optical module 300, and a reflective polarizing module 400.

The light source 100 generally includes an illuminant providing light. The light source 100 generates light on a side portion of the light guide plate 200 and transfers the generated light in the direction of the light guide plate 200.

The light guide plate 200 transfers the light transferred from the light source 100 in the direction of the optical module 300.

The optical module 300 is disposed on an upper portion of the light guide plate 200 and has a configuration that diffuses light transferred from the light guide plate 200 and condenses the dispersed light to transfer the condensed light upwardly. The optical module 300 includes a diffusion sheet 310 and a second light condensing sheet 320.

The diffusion sheet 310 is disposed on the upper portion of the light guide plate 200, diffuses light, and transfers light uniformly to the second light condensing sheet 320.

Specifically, the diffusion sheet 310 has a configuration that diffuses light transferred upwardly uniformly through the light guide plate 200 disposed therebelow and transfers the diffused light to the second light condensing sheet 320 disposed thereon. The diffusion sheet 310 has an uneven diffusion pattern formed on an upper surface or a lower surface thereof to diffuse light.

The second light condensing sheet 320 is coupled to an upper portion of the diffusion sheet 310, and has a second structural pattern 322 including continuously-repeated second unit light-condensing objects 322a, with each transverse cross-section gradually decreasing toward an upper portion thereof.

In the present invention, the second light condensing sheet 320 mainly includes a second base film 324 and the second structural pattern 322.

The second base film 324 is commonly implemented as a light-transmitting film to easily transmit light incident through a lower portion thereof. The second structural pattern 322 refracting and condensing incident light are formed on the upper surface of the second base film 324 to be integrated with the second base film 324.

The second structural pattern 322 includes a plurality of second unit light-condensing objects 322a that are continuously repeated on the upper surface of the second base film 324 to protrude upwardly, with each transverse cross-section gradually decreasing toward the upper portion thereof to form inclined surfaces.

The second unit light-condensing objects 322a refract and condense light passing through the second base film 324 and transfer the condensed light upwardly.

Here, the second structural pattern 322 includes a plurality of prism-shaped portions, with triangular vertical sections thereof extending in one direction.

In this case, the second unit light-condensing objects 322a may be provided in plural and may have the same size and the same shape. Alternatively, the second unit light-condensing objects 322a may have different sizes and different angles of inclination.

In addition, the second unit light-condensing objects 322a may be configured such that doubled inclined surfaces have different angles of inclination thereof, thereby forming polygonal vertical cross-sections.

In the present embodiment, the second unit light-condensing objects 322a are elongated in one direction on an upper surface of the second light condensing sheet 320, and the plurality of second unit light-condensing objects 322a are continuously arranged.

As described above, the optical module 300 includes the diffusion sheet 310 and the second light condensing sheet 320 to condense light transferred through a lower portion thereof and transfer the condensed light upwardly, the diffusion sheet 310 diffusing light transferred through the light guide plate 200, and the second light condensing sheet 320 being disposed on an upper portion of the diffusion sheet 310 and condensing and transferring the diffused light upwardly.

In addition, the reflective polarizing module 400 is stacked on an upper portion of the aforementioned optical module 300 and has a configuration that condenses and polarizes light transferred through a lower portion thereof and uniformly transfers the polarized light upwardly. In the present invention, the reflective polarizing module 400 generally includes a reflective polarization sheet 420 and a bonding layer 430.

The reflective polarization sheet 420 has a configuration that transmits only a specific polarized component of light condensed and transferred by the aforementioned optical module 300 and reflects a remaining component of the light downwardly. The reflective polarization sheet 420 is stacked on the upper portion of the optical module 300.

Generally, a reflective polarization sheet includes a multilayer stack in which at least two materials are alternately stacked. Since at least one material has characteristics such as tensile stress-induced double refraction, a refractive index n of a material is not affected by an elongation treatment.

Since the same stack is elongated, a refractive index of a material is increased in an elongation direction, and a portion of light is reflected due to a difference in refractive indices at a boundary between two layers.

The aforementioned multilayer stack may be usefully used to manufacture a reflective polarizer or a mirror.

Here, the reflective polarizing module 400 may further separately include a first light condensing sheet 410 in addition to the reflective polarization sheet 420 and the bonding layer 430. The reflective polarizing module 400 may not include the first light condensing sheet 410 and may include only the reflective polarization sheet 420 and the bonding layer 430.

Hereinafter, in describing the present embodiment, a configuration in which the reflective polarizing module 400 includes the first light condensing sheet 410 will be described In the present embodiment, as illustrated in FIG. 3, light traveling toward the reflective polarization sheet 420 is in a state in which differently polarized light beams are mixed with each other. The light includes light P1 polarized in a region in which the reflective polarization sheet 420 transmits light, and light P2 polarized in a region in which the reflective polarization sheet 420 does not transmit light.

As illustrated, light passing through the first light condensing sheet 410 and the second light condensing sheet 320 is in a state in which the light P1 and the light P2 are mixed with each other. The reflective polarization sheet 420 transmits only the light P1 and reflects the light P2 downwardly.

While the light P1 is emitted externally, the light P2 is reflected to return downwardly and is reflected by the first light condensing sheet 410, the second light condensing sheet 320, and the light guide plate 200 to travel upwardly. A polarization state of the light P2 is changed through such a process. The polarization state of the light P2 is changed into an appropriate polarization state for the reflective polarization sheet 420 to transmit the light P2.

The reflective polarization sheet 420 according to the present invention having such features has a cooled surface 422 cooled via a separate cooling roll C in a heated state and an exposed surface 424 stacked on an upper portion of the cooled surface 422 and slowly cooled while being exposed to air.

In the present embodiment, the reflective polarization sheet 420 is formed by repeatedly stacking a plurality of materials (in the form of sheets or layers) having different refractive indices and is cooled via the separate cooling roll C in a high temperature state.

Here, the reflective polarization sheet 420 is formed by hardening the multilayer stack formed of a synthetic resin material in a state of being expanded, and is slowly contracted during a cooling process.

Therefore, the cooled surface 422 contacting the separate cooling roll C to be rapidly cooled is hardened in a state of being contracted to a relatively small extent. The exposed surface 424 facing the cooled surface 422 is hardened in a state of being contracted to a relatively great extent because the exposed surface 424 is slowly cooled in contact with air.

The reflective polarization sheet 420 manufactured as described above includes the reflective polarization sheet 420 and the exposed surface 424 manufactured in the shape of sheets. The cooled surface 422, formed on one side, is rapidly cooled in contact with the separate cooling roll C. The exposed surface 424, formed on the other side, is slowly cooled in contact with air.

The reflective polarization sheet 420, formed through such a process, is contracted when the temperature thereof increased due to external factors. A contraction ratio I1 of the cooled surface 422 is greater than a contraction ratio I2 of the exposed surface 424.

That is, the reflective polarization sheet 420 is formed by hardening a multilayer stack in a state of being expanded, and is contracted when the temperature thereof is increased. A contraction ratio of the reflective polarization sheet 420 is gradually increased from the exposed surface 424 to the cooled surface 422 in a stacking direction.

Therefore, when the temperature of the reflective polarization sheet 420 is increased, due to a difference between a contraction ratio I2 of the cooled surface 422 and the contraction ratio of the exposed surface 424, bending is generated such that the exposed surface 424 protrudes.

As described above, the reflective polarization sheet 420 is formed to have the cooled surface 422 and the exposed surface 424 having different contraction ratios and selectively transmits only a portion of light concentrated and transferred by the first light concentrating sheet 410.

Here, a pattern may be formed on any one surface of the cooled surface and the exposed surface of the reflective polarization sheet. In this case, it is possible to diffuse light passing through the reflective polarization sheet.

The bonding layer 430 is disposed on one surface of the reflective polarization sheet 420 and has a configuration that bonds the separate optical module 300 and the reflective polarization sheet 420. Bonding strength between the optical module and the reflective polarization sheet 420 is increased due to the bonding layer 430.

Specifically, the bonding layer 430 according to the present invention is disposed on at least one of the cooled surface 422 and the exposed surface 424 and bonds the separate optical module 300 and the reflective polarization sheet 420. The bonding layer 430 can reduce contraction and bending of the reflective polarization sheet 420, caused by the increase in temperature of the reflective polarization sheet 420 due to the difference between the contraction ratio of the cooled surface 422 and the contraction ratio of the exposed surface 424.

Here, a portion of the second light condensing sheet 320, described above, may be embedded in the bonding layer 430, or a portion of the first light condensing sheet 410 described later may be embedded in the bonding layer 430.

In the present embodiment, as described above, the first light condensing sheet 410 is disposed on the lower portion of the reflective polarization sheet 420. As a result, a portion of the first light condensing sheet 410 is embedded in the bonding layer 430 and the first light condensing sheet 410 is bonded to the reflective polarization sheet 420.

As described above, the bonding layer 430 can stably bond the optical module 300 or the first light condensing sheet 410 to the lower portion of the reflective polarization sheet 420. In addition, the bonding layer 430 may be formed of a material having high optical transmittance so as to transmit light condensed and transferred upwardly by the optical module 300.

In the present embodiment, the bonding layer 430 may be formed of a synthetic resin material, i.e. a material equal to or different from a material of the second light condensing sheet 320 described above.

In addition, as described above, the bonding layer 430 can reduce contraction and bending of the reflective polarization sheet 420, caused by the increase in temperature of the reflective polarization sheet 420 due to the difference between the contraction ratio of the cooled surface 422 and the contraction ratio of the exposed surface 424.

In the present embodiment, as illustrated, the bonding layer 430 is bonded to the cooled surface 422. In this case, the bonding layer 430 has a contraction ratio greater than the contraction ratio I1 of the cooled surface 422.

Therefore, when the cooled surface 422 and the bonding layer 430 are heated at the same temperature, the bonding layer 420 is contracted to a relatively small extent, thereby reducing the bending of the reflective polarization sheet 420.

In addition, as illustrated in FIG. 5, the reflective polarization sheet 420 according to the embodiment of the present invention may be inevitably formed in a state of being bent in a direction from the cooled surface 422 to the exposed surface 424 due to a shape of the separate cooling roll C in a forming process of performing cooling in a stacking state using the separate cooling roll C.

Since the reflective polarization sheet 420 is slightly bent at room temperature but is bent in a bending direction when contracted due to an increase in temperature, it is also possible to reduce a bending degree due to the increase in temperature of the reflective polarization sheet 420 according to the contraction ratio I3 of the first light condensing sheet 430.

As described above, the bonding layer 430 according to the present invention may be disposed on one surface of the reflective polarization sheet 420 to increase bonding strength between the first light condensing sheet 410 and the reflective polarization sheet 420, and may reduce the bending of the reflective polarization sheet 420, caused by the increase in temperature of the reflective polarization sheet 420.

Meanwhile, the first light concentrating sheet 410 has a first structural pattern 412 in which first unit light-condensing objects 412a are continuously repeated, the first unit light-condensing objects 412a having a transverse cross-sectional area gradually decreased toward an upper portion thereof. The first light concentrating sheet 410 is disposed on the upper surface of the second light condensing sheet 320.

The first light concentrating sheet 410 re-condenses light condensed and transferred by the second light condensing sheet 320 and transfers the condensed light upwardly.

Here, the first unit light-condensing objects 412a may be identical to or different from the second unit light-condensing objects 322a described above.

In the present invention, the first light condensing sheet 410 includes a first base film 414 and the first structural pattern 412, similarly to the second light condensing sheet 320.

Here, the first structural pattern 412 is located on a lower portion of the reflective polarization sheet 420 and on an upper surface of the first base film 414.

The first base film 414 and the second base film 324 may be formed of acrylic, urethane, or the like and may be desirably formed of a material having high optical transmittance so as to transmit light transferred from the diffusion sheet 310.

The first light condensing sheet 410 manufactured as described above is stacked under the reflective polarization sheet 420. At least a portion of each of the first unit light-condensing objects 412a is embedded in the bonding layer 430 and the first light condensing sheet 410 is bonded to the reflective polarization sheet 420.

Therefore, the first light condensing sheet 410 and the reflective polarization sheet 420 may be stably bonded to each other while maintaining a bonding state therebetween.

Meanwhile, in the present embodiment, each of the first structural pattern 412 and the second structural pattern 322 is elongated in a transverse direction thereof. An extension direction of the first structural pattern 412 intersects an extension direction of the second structural pattern 322.

In the present embodiment, the extension directions of the first structural pattern 412 and the second structural pattern 322 may intersect each other at a right angle, or merely intersect each other.

Therefore, light diffused and transferred upwardly by the diffusion sheet 310 may be stably condensed while passing through the first unit light-condensing objects 412a and the second unit light-condensing objects 322a As described above, the reflective polarizing module 400 according to the present invention may include the reflective polarization sheet 420, the bonding layer 430, and the first light condensing sheet 410 and may reduce the bending of the reflective polarization sheet 420, due to the contraction ratio difference between the cooled surface 422 and the exposed surface 424.

Therefore, when a temperature of a display device rises due to the continuous use of the display device, it is possible to reduce the bending of the reflective polarization sheet 420, thereby stably using the display device.

The backlight unit according to the present invention as configured above includes the light guide plate 200, the optical module 300, and the reflective polarizing module 400, sequentially stacked and coupled to each other. The backlight unit can stably diffuse and condense light generated by the light source 100.

<Effects>

Next, a process of reducing the bending of the reflective polarization sheet 420 according to the contraction ratio I3 of the bonding layer 430 will be described as follows with reference to FIGS. 6 and 7.

Figure 6:
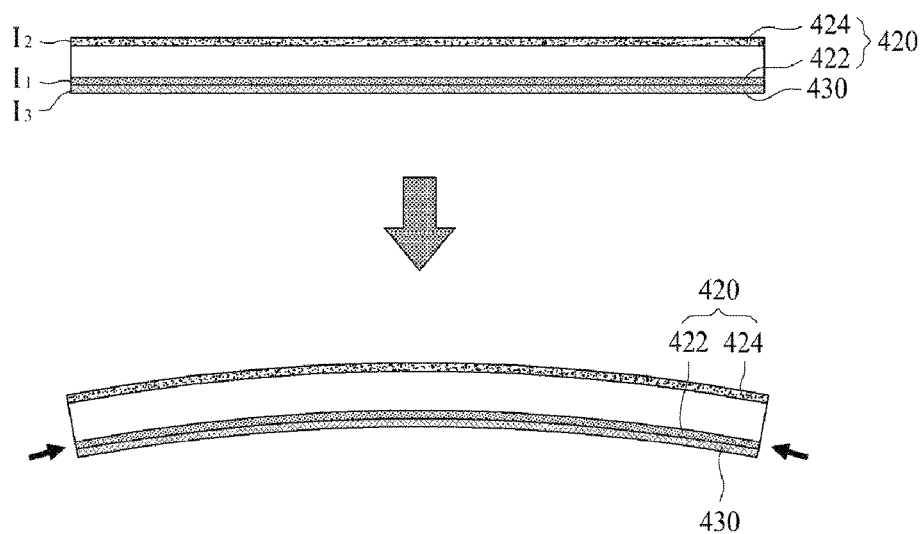
FIG. 6 is a view illustrating contraction due to an increase in temperature when a contraction ratio of a bonding layer is greater than a contraction ratio of a cooled surface in a case in which the bonding layer is disposed on a reflective polarization sheet of FIG. 1.
Figure 7:
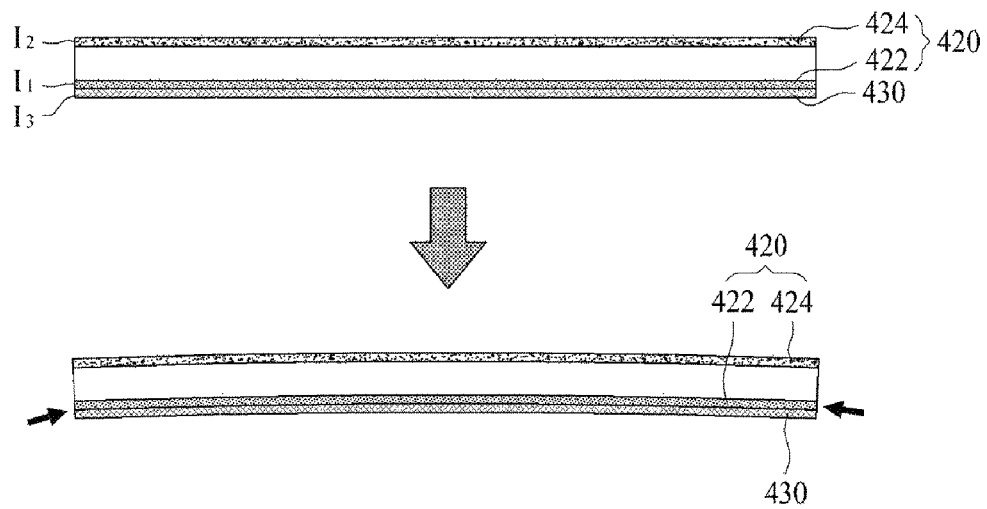
FIG. 7 is a view illustrating contraction due to an increase in temperature when a contraction ratio of a bonding layer is lower than a contraction ratio of a cooled surface in a case in which a first light condensing sheet is bonded to a reflective polarization sheet of FIG. 1.

FIG. 6 is a view illustrating contraction due to an increase in temperature when the contraction ratio I3 of the bonding layer is greater than the contraction ratio I1 of the cooled surface in a case in which the bonding layer is disposed on the reflective polarization sheet of FIG. 1, and FIG. 7 is a view illustrating contraction due to an increase in temperature when the contraction ratio I3 of the bonding layer is lower than the contraction ratio I1 of the cooled surface in a case in which the first light condensing sheet is bonded to the reflective polarization sheet of FIG. 1.

First, referring to FIG. 6, the bonding layer 430 is disposed on the cooled surface 422 of the reflective polarization sheet 420, and the contraction ratio I1 of the cooled surface 422 is lower than or equal to the contraction ratio I3 of the first light condensing sheet 430.

Here, the reflective polarization sheet 420 is configured such that the contraction ratio I1 of the cooled surface 422 is greater than the contraction ratio I2 of the exposed surface 424 as described above. This is because a cooling rate difference is generated by the separate cooling roll C during the formation of the reflective polarization sheet 420 as described above.

As described above, when the contraction ratio I3 of the bonding layer 430 is greater than the contraction ratio I1 of the cooled surface 422, as illustrated, a lot of bending is generated as the temperature of the reflective polarization sheet 420 increases.

When the bending is generated in the reflective polarization sheet 420, as described above, efficiency of the reflective polarizing module 400 is lowered and durability of the backlight itself is lowered.

However, referring to FIG. 7, the bonding layer 430 is bonded to the cooled surface 422 as in the embodiment of the present invention, but the contraction ratio I3 of the bonding layer 430 is lower than the contraction ratio I1 of the cooled surface 422.

When the temperature of the reflective polarization sheet 420 increases, the cooled surface 422 may be contracted. Accordingly, bending is generated such that the exposed surface 424 protrudes. However, since the contraction ratio I3 of the bonding layer 430 disposed on the cooled surface 422 is lower than the contraction ratio I1 of the cooled surface 422, the first light condensing sheet 410 is contracted to a relatively small extent, thereby supporting the reflective polarization sheet 420 and reducing the bending of the reflective polarization sheet 420.

As described above, when the bonding layer 430 is disposed on the cooled surface 422 of the reflective polarization sheet 420, the contraction ratio I3 of the bonding layer 430 can be lower than the contraction ratio I1 of the cooled surface 422, thereby reducing the bending of the reflective polarization sheet 420, caused by the temperature increase of the reflective polarization sheet 420.

Therefore, in order to reduce bending caused by the increase in temperature of the reflective polarization sheet 420, due to a contraction ratio difference generated during the formation of the reflective polarization sheet 420, the bonding layer 430 can be disposed by adjusting a contraction ratio of the bonding layer 430, thereby reducing a decrease in a light condensing effect and a decrease in durability, caused by the contraction of the reflective polarization sheet 420.

<Modified Form>

Next, a case in which the aforementioned bonding layer 430 is bonded to the exposed surface 424 rather than to the cooled surface 422 will be described as follows with reference to FIG. 8.

Figure 8:
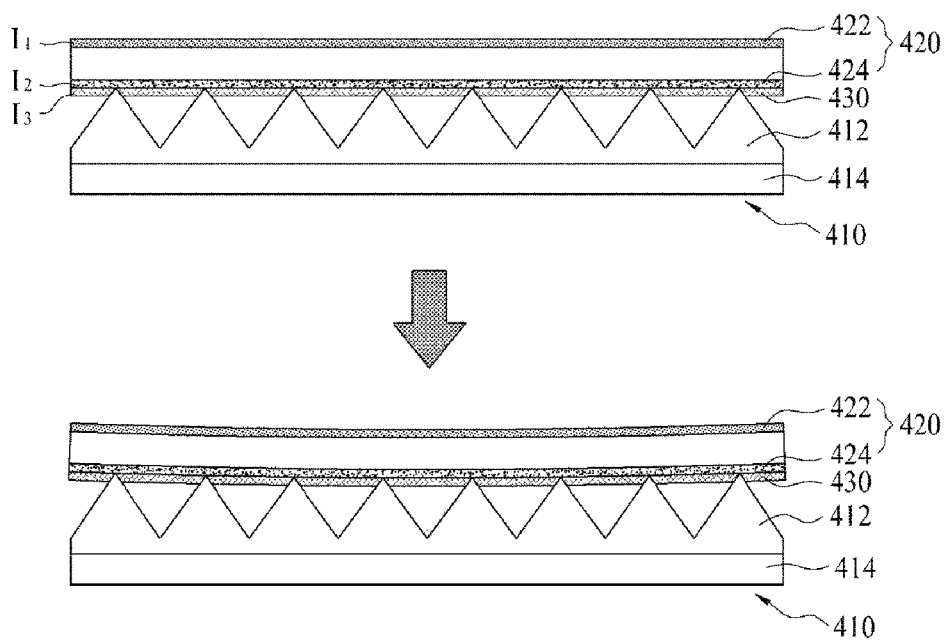
FIG. 8 is a view illustrating a state in which a bonding layer is disposed on an exposed surface in the backlight unit of FIG. 1.

FIG. 8 is a view illustrating a state in which the bonding layer 430 is disposed on the exposed surface 424 in the backlight unit of FIG. 1.

As illustrated, in the present embodiment, the bonding layer 430 may be disposed on the exposed surface 424 rather than on the cooled surface 422.

In this case, the contraction ratio I3 of the bonding layer 430 is configured to be greater than that of the exposed surface 424 through a comparison of contraction ratios of the exposed surface 424 and the bonding layer 430 rather than a comparison of contraction ratios of the cooled surface 422 and the bonding layer 430.

Specifically, since the contraction ratio of the exposed surface 424 is lower than that of the cooled surface 422, contraction is generated due to the increase in temperature of the reflective polarization sheet 420. Thus, bending is generated such that the reflective polarization sheet 420 protrudes downwardly due to a contraction ratio difference.

In this case, as illustrated, when the contraction ratio I3 of the bonding layer 430 is greater than the contraction ratio I2 of the exposed surface 424, the bonding layer 430 can pull the reflective polarization sheet 420 in a direction opposite to a bending direction of the reflective polarization sheet 420, thereby reducing the overall bending of the reflective polarization sheet 420.

Therefore, when the bonding layer 430 is bonded to the exposed surface 424, the contraction ratio I3 of the bonding layer 430 can be lower than the contraction ratio I2 of the exposed surface 424, thereby reducing the bending of the reflective polarization sheet 420.

When the bond layer 430 is bonded to the cooled surface 422, as described above, the contraction ratio I3 of the bonding layer 430 is desirably lower than the contraction ratio I1 of the cooled surface 422.

That is, when the bonding layer 430 is bonded to the cooled surface 422, the contraction ratio I3 of the bonding layer 430 can be lower than that of the cooled surface 422 and when the bonding layer 430 is bonded to the exposed surface 424, the contraction ratio I3 of the bonding layer 430 can be greater than that of the exposed surface 424, thereby reducing the bending of the reflective polarization sheet 420, caused by the increase in temperature of the reflective polarization sheet 420.

Next, a modified form of the first structural pattern 412 in the reflective polarizing module 400 according to the present invention will be described as follows with reference to FIGS. 9 and 10.

Figure 9:
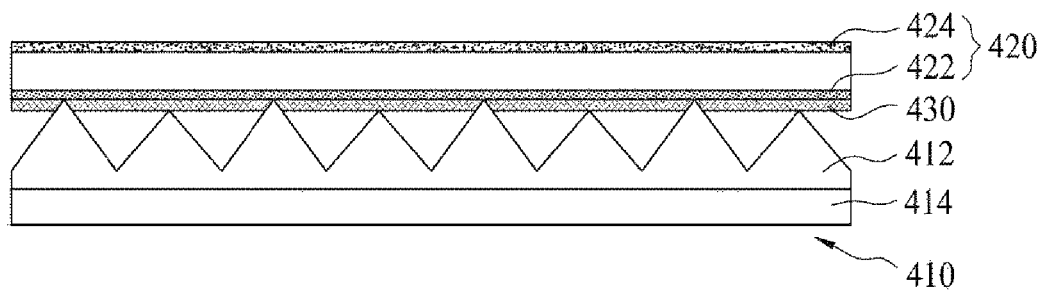
FIG. 9 is a view illustrating non-uniform heights of first unit light-condensing objects formed in a reflective polarizing module of FIG. 1.
Figure 10:
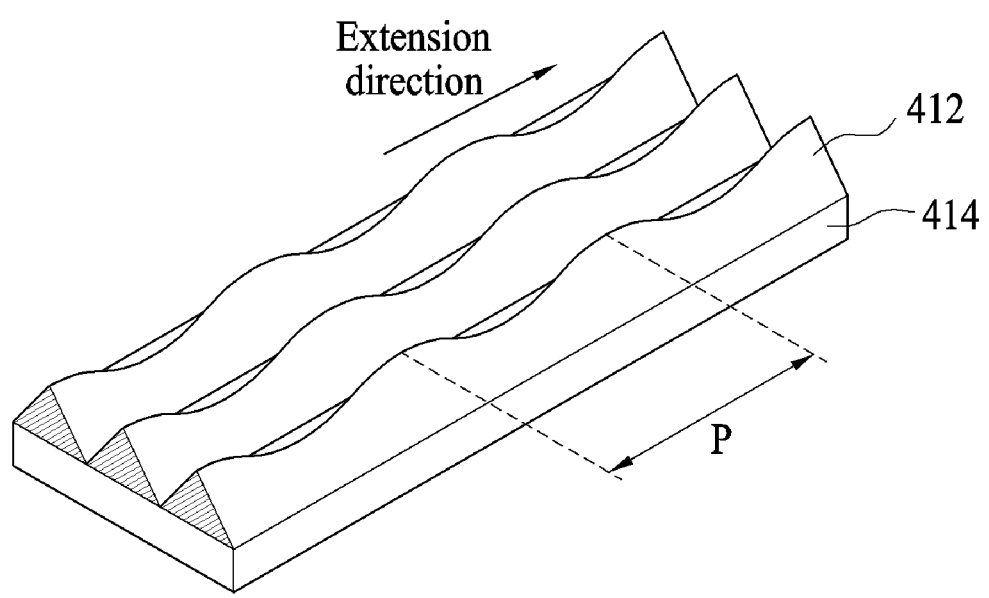
FIG. 10 is a view illustrating the first unit light-condensing objects in the reflective polarizing module of FIG. 1, the heights of respective first unit light-condensing objects varying in an extension direction thereof.

FIG. 9 is a view illustrating non-uniform heights of first unit light-condensing objects formed in the reflective polarizing module of FIG. 1, and FIG. 10 is a view illustrating the first unit light-condensing objects in the reflective polarizing module of FIG. 1, the heights of respective first unit light-condensing objects varying in an extension direction thereof.

First, referring to FIG. 9, unlike as described above, a plurality of first unit light-condensing objects 412a are spaced apart from one another along an upper surface of the first base film 414. Although not illustrated, the plurality of first unit light-condensing objects 412a are elongated and are spaced apart from one another along the upper surface of the first base film 414.

As illustrated, the plurality of first unit light-condensing objects 412a have non-uniform heights from a bottom to a top thereof.

As described above, since the plurality of first unit light-condensing objects 412a have the non-uniform heights, when the first base film 414 and the reflective polarization sheet 420 are bonded to each other, only a portion of each of the plurality of first unit light-condensing objects 412a is bonded to the lower surface of the reflective polarization sheet 420, and the remainder of each of the plurality of first unit light-condensing objects 412a is not embedded.

Since only a portion of each of the plurality of first unit light-condensing objects 412a is embedded in the reflective polarization sheet 420, although the reflective polarization sheet 420 and the first base film 414 are contracted or expanded, a pit cannot be generated in the reflective polarization sheet 420 and a bonding state can be maintained.

In addition, since only a portion of each of the plurality of first unit light-condensing objects 412a is embedded in the bonding layer 430, a loss of an inclined surface can be decreased in the first light condensing sheet 410, thereby minimizing a reduction in a light condensing effect of light transferred from the optical module 300.

Referring to FIG. 11, a modified form of the first unit light-condensing objects 412a is provided on the upper surface of the first base film 414. The plurality of first unit light-condensing objects 412a are elongated along the upper surface of the first base film 414, respectively repeating in the cross-sectional direction.

Here, the plurality of first unit light-condensing objects 412a have non-uniform heights in an extension direction thereof, and only a portion of each thereof is bonded to the lower surface of the reflective polarization sheet 420.

That is, since the plurality of the first unit light-condensing objects 412a have a certain pattern, are uniformly spaced apart from one another, have the non-uniform heights in the extension direction thereof, only a portion of one first unit light-condensing object 412a is embedded in the bonding layer 430 disposed on the lower surface of the reflective polarization sheet 420.

Here, the height of each of the first unit light-condensing objects 412a may vary in a constant period P and may vary irregularly, according to the extension direction.

It will be apparent to those skilled in the art that various modifications and variations can be made in the present invention without departing from the spirit or scope of the inventions. Thus, it is intended that the present invention cover all possible modifications and variations of this invention provided they fall within the scope of the appended claims and their equivalents.

What is claimed is:

1. A reflective polarizing module enabling a reduction in bending, the reflective polarizing module comprising:
   a reflective polarization sheet in a form of a multilayer stack having different refractive indices to selectively transmit light, the reflective polarization sheet comprising a cooled surface cooled in contact with a separate cooling roll in a heated state and an exposed surface stacked on an upper surface of the cooled surface and slowly cooled while being exposed to air, wherein a contraction ratio of the cooled surface, due to an increase in temperature, is greater than a contraction ratio of the exposed surface; and
   a bonding layer disposed on at least one of the cooled surface and the exposed surface to bond the reflective polarization module and a separate optical module to reduce contraction and bending of the reflective polarization sheet, caused by an increase in temperature of the reflective polarization sheet due to a difference between the contraction ratio of the cooled surface and the contraction ratio of the exposed surface.

2. The reflective polarizing module of claim 1, wherein the bonding layer is disposed on the cooled surface and has a contraction ratio lower than a contraction ratio of the cooled surface, due to an increase in temperature.

3. The reflective polarizing module of claim 1, wherein the bonding layer is disposed on the exposed surface and has a contraction ratio greater than a contraction ratio of the exposed surface, due to an increase in temperature.

4. The reflective polarizing module of claim 1, wherein the reflective polarization sheet comprises the multilayer stack, and a contraction ratio of the reflective polarization sheet gradually increases in a stacking direction from the exposed surface to the cooled surface.

5. The reflective polarizing module of claim 1, wherein the reflective polarization sheet comprises the multilayer stack hardened in an expanded state, which is re-contracted when a temperature increases.

6. The reflective polarizing module of claim 1, wherein the reflective polarization sheet is cooled in a stacking state by the separate cooling roll and is bent in a direction from the cooled surface to the exposed surface, due to a shape of the separate cooled surface.

7. The reflective polarizing module of claim 1, wherein the reflective polarization sheet has a pattern located on any one surface of the cooled surface and the exposed surface.

8. The reflective polarizing module of claim 1, further comprising a first light condensing sheet comprising a first structural pattern including continuously-repeated first unit light-condensing objects, with each transverse cross-section thereof gradually decreasing toward an upper portion thereof,
wherein at least a portion of each of the first unit light-condensing objects is embedded in the bonding layer.

9. The reflective polarizing module of claim 8, wherein the first unit light-condensing objects have non-uniform heights from a bottom to a top thereof.

10. The reflective polarizing module of claim 8, wherein the first unit light-condensing objects of the first structural pattern are elongated and repeated, and heights of the first unit light-condensing objects vary in an extension direction.

11. A backlight unit comprising:
a light source disposed on an edge of a light guide plate including a reflective plate on a lower surface thereof to transfer light generated by the light source upwardly;
a reflective polarization sheet in a form of a multilayer stack having different refractive indices to selectively transmit light, the reflective polarization sheet comprising a cooled surface cooled in contact with a separate cooling roll in a heated state and an exposed surface stacked on an upper surface of the cooled surface and slowly cooled while being exposed to air, wherein a contraction ratio of the cooled surface, due to an increase in temperature, is greater than a contraction ratio of the exposed surface; and
a bonding layer disposed on at least one of the cooled surface and the exposed surface to bond the reflective polarization module and a separate optical module to reduce contraction and bending of the reflective polarization sheet, caused by an increase in temperature of the reflective polarization sheet due to a difference between the contraction ratio of the cooled surface and the contraction ratio of the exposed surface.

12. The reflective polarizing module of claim 11, wherein the bonding layer is disposed on the cooled surface and has a contraction ratio lower than a contraction ratio of the cooled surface, due to an increase in temperature.

13. The reflective polarizing module of claim 11, wherein the bonding layer is disposed on the exposed surface and has a contraction ratio greater than a contraction ratio of the exposed surface, due to an increase in temperature.

14. The reflective polarizing module of claim 11, wherein the reflective polarization sheet comprises the multilayer stack, and a contraction ratio of the reflective polarization sheet gradually increases in a stacking direction from the exposed surface to the cooled surface.

15. The reflective polarizing module of claim 11, wherein the reflective polarization sheet comprises the multilayer stack hardened in an expanded state, which is re-contracted when a temperature increases.

16. The reflective polarizing module of claim 11, wherein the reflective polarization sheet is cooled in a stacking state by the separate cooling roll and is bent in a direction from the cooled surface to the exposed surface, due to a shape of the separate cooled surface.

17. The reflective polarizing module of claim 11, wherein the reflective polarization sheet has a pattern located on any one surface of the cooled surface and the exposed surface.

18. The reflective polarizing module of claim 11, further comprising a first light condensing sheet comprising a first structural pattern including continuously-repeated first unit light-condensing objects, with each transverse cross-section thereof gradually decreasing toward an upper portion thereof,
wherein at least a portion of each of the first unit light-condensing objects is embedded in the bonding layer.

19. The reflective polarizing module of claim 18, wherein the first unit light-condensing objects have non-uniform heights from a bottom to a top thereof.

20. The reflective polarizing module of claim 18, wherein the first unit light-condensing objects of the first structural pattern are elongated and repeated, and heights of the first unit light-condensing objects vary in an extension direction.

* * * * *